United States Patent Office 3,546,209
Patented Dec. 8, 1970

3,546,209
PROCESS FOR THE FABRICATION OF A CELLULOSE HOLLOW FIBER SEPARATORY CELL
Ben J. Lipps, Jr., Concord, Calif., assignor to The Dow Chemical Company, Midland, Mich., a corporation of Delaware
No Drawing. Filed Oct. 10, 1968, Ser. No. 766,618
Int. Cl. B01d 13/00; B29d 23/00
U.S. Cl. 260—214                                    7 Claims

ABSTRACT OF THE DISCLOSURE

A process is described for making separatory cells which utilize permeable cellulose hollow fibers wherein in said process cellulose acetate hollow fibers are converted to cellulose fibers. The process involves hydrolysis of the fibers followed by plasticization of the fibers while still wet with a water soluble, non-volatile plasticizer such as glycerine, and then drying of the fibers before fabrication of the separatory cell.

BACKGROUND OF THE INVENTION

The present invention relates to a process for making separatory cells which utilize permeable membranes and in particular permeable, cellulose hollow fiber membranes. Further the invention relates to a process which converts cellulose ester hollow fibers to cellulose hollow fibers.

Permeable membranes have been used for dialysis, reverse osmosis, ultrafiltration and the like for a number of years. However, flat membranes suffer from a number of disadvantages such as the fragile nature of the membrane, need for backing supports which decreases the capacity of a unit, etc. A notable advance in the art occurred when the flat membrane was replaced by fine hollow fibers. With the proper ratio of diameter to wall thickness, no backing support is needed and units with greatly increased capacities can now be manufactured.

The concept of using hollow fibers in a permeability separatory apparatus and the fabrication of same is disclosed in U.S. 3,228,876 and 3,228,877 both issued Jan. 11, 1966 to Mahon; Brown et al., U.S. 3,228,797; Skiens, U.S. 3,186,941; Strand, U.S. 3,342,729; Lewis et al., U.S. 3,198,335; and Maxwell et al., U.S. 3,339,341.

In practice hollow fiber separatory cells are generally prepared so that the terminal portions of the fibers are potted or embedded in a hard resinous material such as a polyepoxide which forms a tube sheet or header member. However, separatory cells with cellulose hollow fibers are difficult to prepare because cellulose hollow fibers are sensitive and easily damaged when handled, in addition to the difficulty in making the hollow cellulose fiber itself.

It is now known that plasticized cellulose esters may be melt extruded to make fine, hollow fibers which can be readily handled and fabricated into separatory cells. However, it has not been found feasible to prepare a separatory cell from cellulose ester fibers and then hydrolyze the potted fibers to convert them to cellulose fibers because of such factors as the dimensional change in the fibers upon hydrolysis, etc. The result is a leaky or inoperative cell.

Because of the enhanced permeability of cellulose which is of value in fabricating an artificial kidney it would be desirable to have a method for making separatory cells which utilize cellulose hollow fibers and which would overcome the above problems.

SUMMARY OF THE INVENTION

This invention is directed to a process for making permeable hollow fiber separatory cells and particularly to a process for making cells which utilize cellulose hollow fibers wherein in said process cellulose acetate hollow fibers are converted to cellulose fibers. Further, the invention relates to a cellulose hollow fiber artificial kidney.

The process comprises (a) hydrolyzing cellulose ester hollow fibers substantially into cellulose fibers; (b) plasticizing said cellulose fiber with a non-volatile, water soluble plasticizer; (c) drying the plasticized fiber; and (d) fabricating a separatory cell from said plasticized fiber. It is important that the fibers be kept wet until plasticized to prevent damage to the fiber and loss of permeability. In the plasticized state the cellulose hollow fibers can be safely dried and fabricated without damage or loss of permeability. In use or prior to use the plasticizer may be leached from the fiber with an aqueous rinse.

DETAILED DESCRIPTION OF THE INVENTION

The process of this invention converts permeable cellulose ester hollow fibers into cellulose hollow fibers having characteristics or properties which allow for handling and fabrication of the fibers into a separatory cell without damaging the fibers or their permeability.

The permeable cellulose ester hollow fibers may be made in several ways but preferably are made by a melt extrusion process wherein the cellulose ester is plasticized to reduce its melting point below the decomposition point. Increased permeability is imparted to said melt extruded hollow fibers when a plasticizer is used which can be leached away from the formed fiber by a solvent which is a non-solvent for the polymer. Melt extruded fibers can be made in this way which have excellent uniformity and fineness in size with improved freedom from pinholes and other imperfections and can be made at high production rates.

When hollow fibers are prepared for use in making artificial kidneys more than water permeability is desired since the dialysis of blood must be capable of removing salt, urea and other like waste materials from the blood. This can be accomplished by incorporating with the plasticizer a material such as a polyol which is also water leachable or alternatively to soak the extruded hollow fiber in an aqueous solution containing a swelling agent. Such methods are disclosed in greater detail in the copending applications of W. E. Skiens filed on Nov. 4, 1966 and having Ser. No. 591,961, now U.S. Pat. No. 3,494,780, and 591,992.

Cellulose esters are well known and include such film-forming polymers as cellulose mono-, di-, and triacetates, propionates, butyrates, etc. as well as mixed esters such as cellulose acetate propionate, and the like. Cellulose acetate having an average degree of acetylation of about 2.5 is preferred.

Plasticizers used in the preparation of the hollow fibers must be soluble in a solvent which is a non-solvent for the cellulose ester. Preferably the plasticizer is water soluble. Suitable plasticizers include dimethyl sulfoxide, α- pyrrolidone, α-butyrolactone, diethyl phthalate and similar like esters, etc., and other materials fully disclosed in the previously cited copending applications of W. E. Skiens. Preferably the plasticizer is tetramethylene sulfone (commonly called sulfolane).

The first step of the process of this invention involves hydrolysis of the permeable, cellulose ester hollow fiber to substantially a cellulose fiber. By substantially it is meant that a substantial portion of the ester groups are hydrolyzed back to the cellulose hydroxyl group. Complete hydrolysis is usually not obtained nor is it necessary. When the cellulose ester fiber is prepared by the above described melt extrusion technique, the plasticizer is simultaneously leached from the fiber during hydrolysis or deacetylation.

Deacetylation techniques are well known, of which the simplest is hydrolysis by an alkaline solution. Methods of deacetylation have been discussed in a variety of papers and books such as Hiller, J. Polymer Sci. 10, 385 (1953); Howlett et al., Textile Inst. J. 38, 212 (1947); Laidler, Chemical Kinetics, McGraw-Hill Book Co., New York (1950), pp. 282–290; etc. Preferably the cellulose acetate is hydrolyzed by an aqueous sodium hydroxide bath. Following hydrolysis the cellulose fiber may then be rinsed to remove excess hydrolyzing solution and the products of hydrolysis such as sodium acetate, etc. Alternately the excess hydrolyzing agent may be neutralized. While it is not essential to rinse the fiber after hydrolysis it is preferable to do so.

The critical step in the process which permits the cellulose fiber to be dried without losing its permeability and to be handled without damaging the fiber is to plasticize the cellulose fiber following the hydrolysis step and to plasticize while the fiber is still wet. Any water soluble plasticizer which is essentially non-volatile may be used. By essentially non-volatile it is meant that the plasticizer is essentially retained by the cellulose fiber during the subsequent drying step and upon storage at ambient temperatures.

Generally, the plasticized fiber should contain from about 10 to about 80 percent by weight plasticizer in order to retain good permeability. The fiber can be plasticized in several different ways, but the most convenient is to immerse the fiber into an aqueous solution of the plasticizer for a sufficient length of time to plasticize the fiber.

Suitable plasticizers include those which are capable of swelling the cellulose fiber presumably by such interactions as hydrogen bonding or dipole-dipole reactions. Preferably the plasticizer is a hydroxyl containing compound and more preferably a polyol such as polyalkylene oxides; glycols such as ethylene glycol, diethylene glycol, dipropylene glycol, tripropylene glycol and the like; glycerine and the like. Glycerine is a plasticizer of choice.

Following plasticization the fiber is then dried by any convenient method such as vacuum drying, forced air drying at ambient or elevated temperatures, and the like. Elevated temperatures may be used so long as the temperature does not cause any substantial loss of plasticizer. Consequently, an elevated drying temperature is dependent on the particular plasticizer used and a suitable temperature is readily determined.

The dried, plasticized fiber can now be safely stored without losing its permeability and can be fabricated at a later time into a separatory cell or it can be fabricated at once into a separatory cell. A wide variety of fabrication techniques are known such as those disclosed in the previously recited patents on hollow fiber devices. There is no limitation as to the type of device other than the limitation of utilizing a permeable hollow fiber.

In use the separatory cell is then rinsed to leach the plasticizer away from the fiber. The leaching may be done either prior to use or during use depending on the particular application. Because of the limited dimensional change which occurs during resubstitution of water for the plasticizer tight seals with the tube sheet or header are maintained. This is especially important when fabricating an artificial kidney since any leakage would contaminate the blood with the dialyzing solution.

Example 1

According to the process of this invention, 2,500 cellulose triacetate fibers having an internal diameter of 270μ and containing about 35% by weight of sulfolane plasticizer were deacetylated in a 1% solution of NaOH in methyl alcohol for 2 hours at 50° C. The fibers were then rinsed followed by soaking in a 50% by weight solution of glycerine in water for one hour. The wet, plasticized fibers were then sucked clean of liquid with an aspirator and dried at 50° C. for from 24 to 36 hours.

A separatory cell was then fabricated during which the fiber ends were first plugged with paraffin wax before the terminal portions of the fibers were potted in Silastic RTV–601, a dimethyl siloxane polymer, and cured for 24 hours. After curing the separatory cell was assembled, the paraffin wax removed and the cell pressure tested at 200 mm. Hg. The cell did not leak and was found to be quite permeable to sodium chloride in aqueous solution.

Similar cells were prepared in which an aqueous NaOH solution was used to hydrolyze the cellulose acetate fibers.

Example 2

Four tows of cellulose acetate fibers containing 16 fibers in each tow are wrapped around a porous wall drum, 10 inches in diameter by 18 inches in length. The fibers are then deacetylated by immersing the drum in a 1% by weight aqueous NaOH solution kept at 50° C. for at least 10 minutes. The drum is then transferred to a water rinse bath and after rinsing the fibers are passed through a 40% glycerine-60% water bath at 25° C. for 5–10 minutes. The fibers are then dried at 115° C. in an oven. The dried fibers are then fabricated into a separatory cell by potting the fibers with a Silastic potting compound. The Silastic potting compound may be replaced by a polyepoxide resin.

What is claimed is:
1. A process for preparing a hollow cellulose fiber separatory cell which comprises:
  (a) hydrolyzing a cellulose ester hollow fiber substantially into a cellulose hollow fiber;
  (b) plasticizing said cellulose fiber while said fiber is still wet with a water soluble, essentially non-volatile plasticizer;
  (c) drying said plasticized fiber; and
  (d) fabricating a separatory cell from said plasticized fibers.
2. The process of claim 1 wherein said cellulose ester hollow fiber contains a plasticizer which is soluble in a solvent which is a non-solvent for said cellulose ester fiber.
3. The process of claim 1 wherein said cellulose ester is cellulose triacetate.
4. The process of claim 1 wherein the cellulose ester is hydrolyzed in an alkaline solution.
5. The process of claim 1 wherein said plasticizer is a hydroxyl containing compound.
6. The process of claim 5 wherein said plasticizer is glycerine.
7. A process for preparing a hollow cellulose fiber separatory cell which comprises:
  (a) in an alkaline solution hydrolyzing an acetylated cellulose, hollow fiber substantially into a cellulose hollow fiber wherein said acetylated cellulose fiber contains tetramethylene sulfone as a plasticizer;
  (b) plasticizing said cellulose fiber while said fiber is still wet with a water soluble, hydroxyl containing, essentially non-volatile plasticizer so as to contain from about 10 to about 80 percent by dry weight of said plasticizer;

(c) drying said plasticized fiber; and
(d) fabricating a separatory cell from said plasticized fibers.

References Cited

UNITED STATES PATENTS

| | | | |
|---|---|---|---|
| 3,276,996 | 10/1966 | Lazare | 210—22 |
| 3,290,286 | 12/1966 | Kesting | 260—230 |
| 3,412,184 | 11/1968 | Sharples et al. | 264—49 |
| 3,423,491 | 1/1969 | McLain et al. | 264—49 |
| 3,432,584 | 3/1969 | Cannon et al. | 264—49 |
| 3,441,142 | 4/1969 | Oja | 210—321 |

HOSEA E. TAYLOR, Primary Examiner

R. W. GRIFFIN, Assistant Examiner

U.S. Cl. X.R.

106—189; 210—321; 260—230; 264—49